United States Patent
Kinoshita et al.

(10) Patent No.: US 9,434,376 B2
(45) Date of Patent: Sep. 6, 2016

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Gohki Kinoshita, Susono (JP); Yoshihito Kanno, Numazu (JP); Hiroki Morita, Hiratsuka (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/758,846

(22) PCT Filed: Jan. 31, 2013

(86) PCT No.: PCT/JP2013/052239
§ 371 (c)(1),
(2) Date: Jul. 1, 2015

(87) PCT Pub. No.: WO2014/118950
PCT Pub. Date: Aug. 7, 2014

(65) Prior Publication Data
US 2015/0353073 A1 Dec. 10, 2015

(51) Int. Cl.
*B60W 20/10* (2016.01)
*B60W 20/00* (2016.01)
(Continued)

(52) U.S. Cl.
CPC .......... *B60W 20/1084* (2013.01); *B60K 6/445* (2013.01); *B60W 10/06* (2013.01);
(Continued)

(58) Field of Classification Search
CPC ........... B60W 20/00; B60W 20/1084; B60W 20/17; B60W 10/06; B60W 2710/0622; B60K 6/445; F02D 20/00; F02D 29/02; F02D 41/0002; F02D 41/0215; Y02T 10/6239; Y10S 903/905
USPC ........................................................ 701/22
See application file for complete search history.

(56) References Cited

U.S. PATENT DOCUMENTS

2015/0218989 A1* 8/2015 Kaneko ................. F01N 3/2006
60/286
2015/0258976 A1* 9/2015 Takahashi .............. B60K 6/445
701/22
(Continued)

FOREIGN PATENT DOCUMENTS

JP 2005-199971 A 7/2005
JP 2007-009835 A 1/2007
(Continued)

*Primary Examiner* — McDieunel Marc
*Assistant Examiner* — James E Stroud
(74) *Attorney, Agent, or Firm* — Kenyon & Kenyon LLP

(57) ABSTRACT

The control apparatus of the present invention is applied to a hybrid vehicle that, as power sources for propulsion, includes an internal combustion engine that can change over between lean combustion and stoichiometric combustion, and motor-generators. The control apparatus performs the noise suppression control in which the operating points of the internal combustion engine are limited so as to suppress noise generated by a power transmission mechanism, and changes over the operational mode of the internal combustion engine if the thermal efficiency when performing the noise suppression control by changing over the operational mode of the internal combustion engine is higher than the thermal efficiency when performing the noise suppression control by keeping the operational mode of the internal combustion engine the same.

7 Claims, 8 Drawing Sheets

(51) Int. Cl.
*F02D 29/02* (2006.01)
*F02D 41/00* (2006.01)
*B60K 6/445* (2007.10)
*B60W 10/06* (2006.01)
*F02D 41/30* (2006.01)
*F02D 41/02* (2006.01)

(52) U.S. Cl.
CPC ............ *B60W 20/00* (2013.01); *B60W 20/17* (2016.01); *F02D 29/02* (2013.01); *F02D 41/0002* (2013.01); *F02D 41/3076* (2013.01); *B60W 2710/0622* (2013.01); *F02D 41/0215* (2013.01); *F02D 2200/025* (2013.01); *Y02T 10/6239* (2013.01); *Y10S 903/905* (2013.01)

(56) References Cited

U.S. PATENT DOCUMENTS

| | | | | |
|---|---|---|---|---|
| 2015/0298687 | A1* | 10/2015 | Kanno | B60K 6/445 701/22 |
| 2015/0353074 | A1* | 12/2015 | Kinoshita | B60K 6/445 701/22 |
| 2015/0377164 | A1* | 12/2015 | Kanno | F02D 29/02 290/40 R |

FOREIGN PATENT DOCUMENTS

| | | |
|---|---|---|
| JP | 2007-203825 A | 8/2007 |
| JP | 2008-201351 A | 9/2008 |

\* cited by examiner

RS<RL

CONTROL APPARATUS FOR HYBRID VEHICLE

CROSS-REFERENCE TO RELATED APPLICATION

This is a national phase application based on the PCT International Patent Application No. PCT/JP2013/052239 filed Jan. 31, 2013, the entire contents of which are incorporated herein by reference.

TECHNICAL FIELD

The present invention relates to a control apparatus for application to a hybrid vehicle that is equipped with an internal combustion engine that can be changed over both to lean combustion and to stoichiometric combustion.

BACKGROUND ART

A hybrid vehicle is per se known in which the power of an internal combustion engine is split between a first motor-generator and an output unit, and a second motor-generator is connected to this output unit via a gear. With a hybrid vehicle of this type, when the motor torque of the second motor-generator is in the vicinity of 0 Nm, the pressure upon the output unit by the gear that is provided as interposed between the output unit and the second motor-generator becomes slackened. As a result, due to transmission of torque fluctuations or rotational speed fluctuations of the internal combustion engine, the output unit and the gear mutually collide because of backlash between them, and noise such as gear rattle noise or the like is generated. Accordingly a control apparatus has been proposed that reduces fluctuations of the output of the internal combustion engine and suppresses noise by changing the operating point of the internal combustion engine to the high rotational speed low torque side if a condition for suppression of noise generated by such a power transmission mechanism becomes valid (refer to Patent Document #1). Apart from the above, Patent Document #2 in the following Citation List may also be considered to have some relevance to the present invention.

CITATION LIST

Patent Literature

Patent Document #1: JP2008-201351A.
Patent Document #2: JP2007-203825A.

SUMMARY OF INVENTION

Technical Problem

An internal combustion engine is per se known in which, in order to enhance the fuel consumption, the operational mode is changed over between lean combustion and stoichiometric combustion. If such an internal combustion engine is applied to a hybrid vehicle, and if noise suppression control of the type described above for suppressing noise is performed in both of these operational modes, then there is a possibility that, between the thermal efficiency of the internal combustion engine while performing the noise suppression control during the lean combustion and the thermal efficiency of the internal combustion engine while performing the noise suppression control during the stoichiometric combustion, the magnitude relationship may change due to driving conditions.

Accordingly, the object of the present invention is to provide a control apparatus for a hybrid vehicle, which is capable of suppressing the generation of noise by the power transmission mechanism, while still preventing deterioration of the thermal efficiency of the internal combustion engine.

Solution to Technical Problem

The control apparatus for a hybrid vehicle according to the present invention is applied to a hybrid vehicle that comprises, as power sources for propulsion, an internal combustion engine that is capable of changing over to lean combustion and to stoichiometric combustion and an electric motor, and in which engine torque of the internal combustion engine and motor torque of the electric motor are outputted to a drive wheel via a power transmission mechanism that includes a gear group, comprising: a combustion changeover device configured to change over an operational mode of the internal combustion engine between the lean combustion and the stoichiometric combustion by changing the air/fuel ratio of the internal combustion engine; a noise suppression control device configured to, during each of the lean combustion and the stoichiometric combustion, execute noise suppression control in which an operating point of the internal combustion engine as defined by engine rotational speed and engine torque is limited so that noise generated by the power transmission mechanism is suppressed; and a thermal efficiency calculation device configured to calculate a thermal efficiency of the internal combustion engine, both when the noise suppression control is being executed with the lean combustion, and also when the noise suppression control is being executed with the stoichiometric combustion; wherein the combustion changeover device changes over the operational mode of the internal combustion engine if the thermal efficiency calculated by the thermal efficiency calculation device will be higher if the noise suppression control is executed with the operational mode of the internal combustion engine being changed over, than if the noise suppression control is executed with the operational mode of the internal combustion engine being kept the same.

According to this control apparatus, while executing noise suppression control, the operational mode of the internal combustion engine is changed over if the thermal efficiency will be higher if the operational mode is changed over, as compared to the thermal efficiency if the operational mode of the internal combustion engine is kept the same. Accordingly, it is possible to avoid a situation in which, during execution of noise suppression control, an operational mode in which the thermal efficiency of the internal combustion engine is relatively poor is maintained. Due to this, it is possible to suppress noise generated by the power transmission mechanism while still avoiding deterioration of the thermal efficiency of the internal combustion engine.

According to one aspect of the control apparatus of the present invention, it will also be acceptable to arrange for the noise suppression control device, when changing over from the stoichiometric combustion to the lean combustion during execution of the noise suppression control, to shift the operating point of the internal combustion engine toward a high rotational speed side from the stoichiometric combustion to the lean combustion is made; and for the combustion changeover device, when changing over the operational mode of the internal combustion engine from the stoichiometric combustion to the lean combustion, to change the air/fuel ratio of the internal combustion engine after the noise suppression control device has started to shift the operating point of the internal combustion engine toward the high rotational speed side.

Since it is more difficult to maintain a stable state of combustion during the lean combustion as compared to during the stoichiometric combustion, accordingly the output of engine rotational speed and the output of engine torque and so on of the internal combustion engine can easily fluctuate. Due to this, the region in which noise gets worse is wider toward the high rotational speed side during the lean combustion than during the stoichiometric combustion, and moreover is narrower toward the low rotational speed side during the stoichiometric combustion than during the lean combustion. Accordingly, when the noise suppression control is being performed during the stoichiometric combustion and the operating point of the internal combustion engine is not shifted, then, when the air/fuel ratio is changed and the system changes over from the stoichiometric combustion to the lean combustion, there is a possible that the noise may get worse before and after the changeover, even though the internal combustion engine is at the same operating point. According to this aspect of the present invention, when changeover from the stoichiometric combustion to the lean combustion is performed during execution of the noise suppression control, the air/fuel ratio is changed and the changeover from stoichiometric to the lean combustion is performed after shifting of the operating point of the internal combustion engine toward the high rotational speed side has been started. Accordingly it is possible to prevent the noise getting worse along with changeover of the operating mode, since it is possible to avoid change of the air/fuel ratio in the state in which the operational mode is stoichiometric consumption. It should be understood, in the shifting of the operating point toward the high rotational speed side that is performed before change of the air/fuel ratio, the noise does not deteriorate due to shifting of the operating point, because the shifting is in the direction in which the noise gets better.

According to another aspect of the control apparatus of the present invention, it would also be acceptable to arrange for the noise suppression control device, when changing over from the lean combustion to the stoichiometric combustion during execution of the noise suppression control, to shift the operating point of the internal combustion engine toward a low rotational speed side; and for the combustion changeover device, when changing over the operational mode of the internal combustion engine from the lean combustion to the stoichiometric combustion, to start changing the air/fuel ratio of the internal combustion engine before the noise suppression control device shifts the operating point of the internal combustion engine toward the low rotational speed side.

The more the operating point of the internal combustion engine is positioned toward the low rotational speed side, the worse the noise becomes. When changing over from the lean combustion to the stoichiometric combustion during execution of the noise suppression control, if the operating point of the internal combustion engine is shifted to the low rotational speed side in the state of the lean combustion, then there is a possible that the noise will become worse due to this shifting, even if this is an operating point for which there is no problem in the case of stoichiometric consumption. According to this aspect of the present invention, when a changeover is made from the lean combustion to the stoichiometric combustion during execution of the noise suppression control, the operating point of the internal combustion engine is only shifted toward the low rotational speed side after change of the air/fuel ratio has been started. Accordingly it is possible to prevent the noise getting worse along with the changeover of the operational mode, since it is possible to avoid shifting of the operating point of the engine shifting toward the low rotational speed side in the state in which the operational mode is the lean combustion.

According to yet another aspect of the control apparatus of the present invention, it would also be acceptable to arrange for a first noise suppression line that corresponds to the stoichiometric combustion, and a second noise suppression line that corresponds to the lean combustion and that is positioned more toward a high rotational speed low torque side than the first noise suppression line to be set in terms of engine rotational speed and engine torque; and for the noise suppression control device to perform the noise suppression control by limiting the operating point of the internal combustion engine to be upon either one of the first noise suppression line and the second noise suppression line, and moreover, according to changeover of the operating mode of the internal combustion engine, to shift the operating point of the internal combustion engine from being upon one of the first noise suppression line or the second noise suppression line, to being upon the other one of the first noise suppression line or the second noise suppression line. According to this aspect, it is possible to implement the noise suppression control by using the first noise suppression line and the second noise suppression line, which have been set to correspond to the respective operational modes.

In the aspect described above, it would also be acceptable to arrange for the combustion changeover device, when changing over the operational mode of the internal combustion engine from the stoichiometric combustion to the lean combustion, to change the air/fuel ratio of the internal combustion engine after the noise suppression control device has started to shift the operating point of the internal combustion engine from being upon the first noise suppression line toward the second noise suppression line. Moreover, it would also be acceptable to arrange for the combustion changeover device, when changing over the operational mode of the internal combustion engine from the lean combustion to the stoichiometric combustion, to start changing the air/fuel ratio of the internal combustion engine before the noise suppression control device shifts the operating point of the internal combustion engine from being upon the second noise suppression line toward the first noise suppression line. In these cases as well, in a similar manner to that described above, it is possible to prevent the noise from getting worse along with changeover of the operational mode.

In the aspect described above, it would also be acceptable to make the combustion changeover device shift the operating point of the internal combustion engine along a line of equal power that connects the first noise suppression line and the second noise suppression line. In this case, since it is possible to shift the operating point while maintaining the power of the internal combustion engine, accordingly the efficiency is high, as compared with a case in which the power of the internal combustion engine increases and/or decreases during the process of shifting of the operating point, and this increase and/or decrease is cancelled out by the motor torque of the electric motor.

It should be understood that, in this description of the control apparatus of the present invention, the term "stoichiometric combustion" includes, not only combustion in which an air/fuel ratio is targeted that is precisely equal to the theoretical air/fuel ratio, but also combustion in which an air/fuel ratio is targeted that is in the vicinity of the theoretical air/fuel ratio. Moreover, the term "lean combustion" means combustion in which an air/fuel ratio is targeted whose value is greater than that during the stoichiometric combustion, in other words combustion in which the targeted air/fuel ratio is toward the lean side.

DESCRIPTION OF EMBODIMENTS

Embodiment #1

Figure 1:
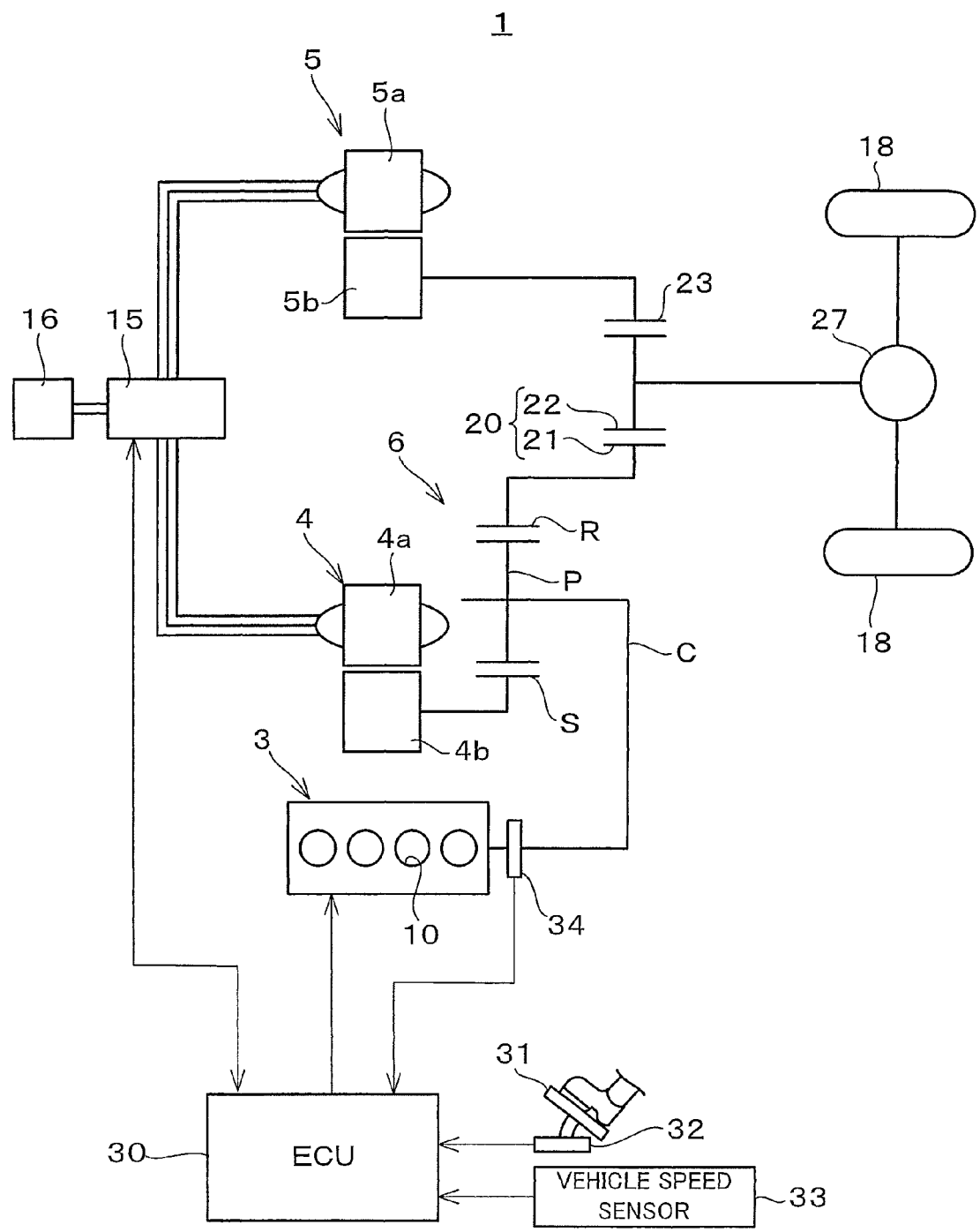
FIG. 1 is a figure showing the overall structure of a vehicle to which a control apparatus according to an embodiment of the present invention is applied.

As shown in FIG. 1, a vehicle 1 is built as a hybrid vehicle in which a plurality of power sources are combined. As power sources for propulsion, this vehicle 1 comprises an internal combustion engine 3 and two motor-generators 4 and 5. The internal combustion engine 3 is built as a spark ignition type internal combustion engine of the four-cylinder in line type, and has four cylinders 10. The operational mode of this internal combustion engine 3 can be changed over between stoichiometric combustion in which the theoretical air/fuel ratio or an air/fuel ratio in the vicinity of the theoretical air/fuel ratio is targeted, and lean combustion in which an air/fuel ratio is targeted that is set toward the lean side from the target air/fuel ratio for the stoichiometric combustion.

The internal combustion engine 3 and the first motor-generator 4 are connected to a power split mechanism 6. The first motor-generator 4 has a stator 4a and a rotor 4b. The first motor-generator 4, along with functioning as a generator by receiving some of the power of the internal combustion engine 3 that has been split off by the power split mechanism 6 and generating electrical power therefrom, also functions as an electric motor that is driven by AC electrical power. In a similar manner, the second motor-generator 5 has a stator 5a and a rotor 5b, and can function both as an electric motor and as a generator. Both of the motor-generators 4 and 5 are connected to a battery 16 via a motor control device 15. The motor control device 15 converts the electrical power generated by the motor-generators 4 and/or 5 into DC electrical power which is accumulated in the battery 16, and also converts electrical power from the battery 16 into AC power which is supplied to the motor-generators 4 and/or 5. The second motor-generator 5 corresponds to the "electric motor" of the Claims.

The power split mechanism 6 is built as a single pinion type planetary gear mechanism. This power split mechanism 6 comprises a sun gear S that is an externally toothed gear wheel, a ring gear R that is an internally toothed gear wheel and that is disposed so as to be coaxial with the sun gear S, and a planetary carrier C rotatably supporting a pinion P that is meshed with these gears S and R and that can revolve around between them. The engine torque outputted by the internal combustion engine 3 is transmitted to the planetary carrier C of the power split mechanism 6. And the rotor 4b of the first motor-generator 4 is connected to the sun gear S of the power split mechanism 6. The torque outputted from the power split mechanism 6 via the ring gear R is transmitted to an output unit of an output gear train 20 and the like. This output gear train 20 comprises a driving output gear 21 that rotates integrally with the ring gear R of the power split mechanism 6 and a driven output gear 22 that is meshed with this driving output gear 21. The second motor-generator 5 is connected to the driven output gear 22 via a gear 23. This gear 23 rotates integrally with the rotor 5b of the second motor-generator 5. And the torque outputted from the driven output gear 22 is distributed via a differential device 27 to left and right drive wheels 18. Each of the power transmission mechanism 6, the output gear train 20, and the differential device 27 includes a gear group. Since the torques from the internal combustion engine 3 and from the second motor-generator 5 are outputted to the drive wheels 18 via the power split mechanism 6, the output gear train 22, and the differential device 27, accordingly these devices correspond to the "power transmission mechanism" of the Claims.

Control of the various sections of the vehicle 1 is performed by an electronic control unit 30 (i.e. by an ECU) which comprises a computer. The ECU 30 performs various types of control for the internal combustion engine 3 and for the motor-generators 4 and 5 and so on. Information of various kinds relating to the vehicle 1 is inputted to the ECU 30. For example, the rotational speeds and the torques of the motor-generators 4 and 5 are inputted to the ECU 30 via the motor control device 15. Moreover, the output signal from an accelerator opening amount sensor 32 which outputs a signal corresponding to the amount by which an accelerator pedal 31 is stepped upon, the output signal from a vehicle speed sensor 33 which outputs a signal corresponding to the speed of the vehicle 1, the output signal from a crank angle sensor 34 which outputs a signal corresponding to the rotational speed of the internal combustion engine 3, and so on, are inputted to the ECU 30. The ECU 30 calculates a requested drive torque which a driver is requesting by referring to the output signal of the accelerator opening amount sensor 32 and to the output signal of the vehicle speed sensor 33, and controls the vehicle 1 while changing over to modes of various types so that the system efficiency becomes optimum in relation to this requested drive torque. For example, in the low load region in which the thermal efficiency of the internal combustion engine 3 drops, an EV mode is selected in which combustion by the internal combustion engine 3 is stopped and the second motor-generator 5 is driven. Moreover, if the amount of torque provided by only the internal combustion engine 3 will not be sufficient, then a hybrid mode is selected in which both the internal combustion engine 3 and also the second motor-generator 5 are employed as drive power sources for propulsion.

When the vehicle 1 is being driven steadily in the hybrid mode, the ECU 30 shifts the operating point of the internal combustion engine 3 so as to keep the thermal efficiency of the internal combustion engine 3 as high as possible. If the requested drive torque for the vehicle 1 cannot be fulfilled only by the engine torque of the internal combustion engine 3, then the amount lacking to make up the requested drive torque is supplemented with motor torque from the second motor-generator 5. But if the greater portion of the requested drive torque is fulfilled by the torque of the internal combustion engine 3, then the motor torque of the second motor-generator 5 becomes a small value in the vicinity of 0 Nm. In this type of state, the mutual pressure force between the gear 23 that is connected to the second motor-generator 5 and the driven output gear 22 becomes weak. Due to this, the result of fluctuations of the rotational speed or of the torque of the internal combustion engine 3 being transmitted to the driven output gear 22 is that the gear 23 and the driven output gear 22 may mutually collide due to backlash between them, in which case noise such as gear rattle noise or the like is generated by the power transmission mechanism.

Figure 2:
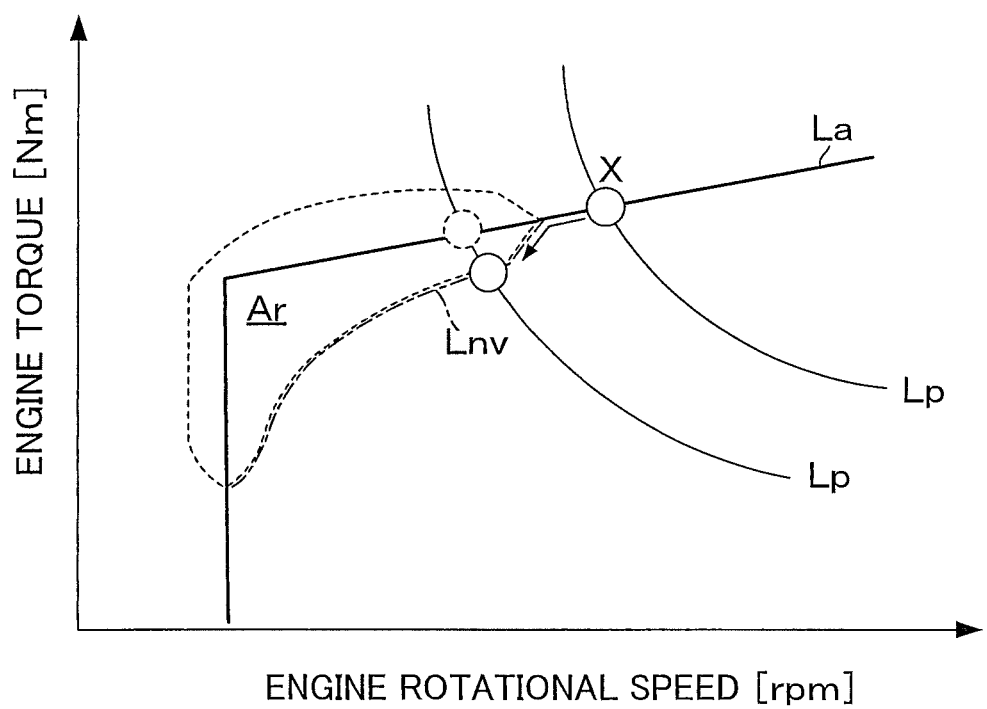
FIG. 2 is a figure for explanation of a summary of noise suppression control.

However, the ECU 30 implements noise suppression control in order to suppress this type of noise generated by the power transmission mechanism. As shown in FIG. 2, a noise worsening region Ar in which noise is generated at a level that exceeds a permitted limit is defined in terms of the engine rotational speed and the engine torque, and moreover a noise suppression line Lnv is set for avoiding this noise worsening region Ar. And the ECU 30 limits the operating point X of the internal combustion engine 3 to be upon the noise suppression line Lnv shown by the dashed line, so that the operating point X of the internal combustion engine 3, which shifts upon a fuel consumption line La that is set on the basis of the thermal efficiency of the internal combustion engine 3, does not enter into the noise worsening region Ar. The noise worsening region Ar and the noise suppression line Lnv are both specified in advance by testing with actual equipment or the like, and information relating to them is stored in the ECU 30. Since the conditions for generation of noise are different depending upon the operational mode of the internal combustion engine 3, accordingly the noise worsening region Ar and the noise suppression line Lnv are set for each of the operational modes of the internal combustion engine 3. Moreover, the fuel consumption line La is also set for each of the operational modes.

Figure 3:
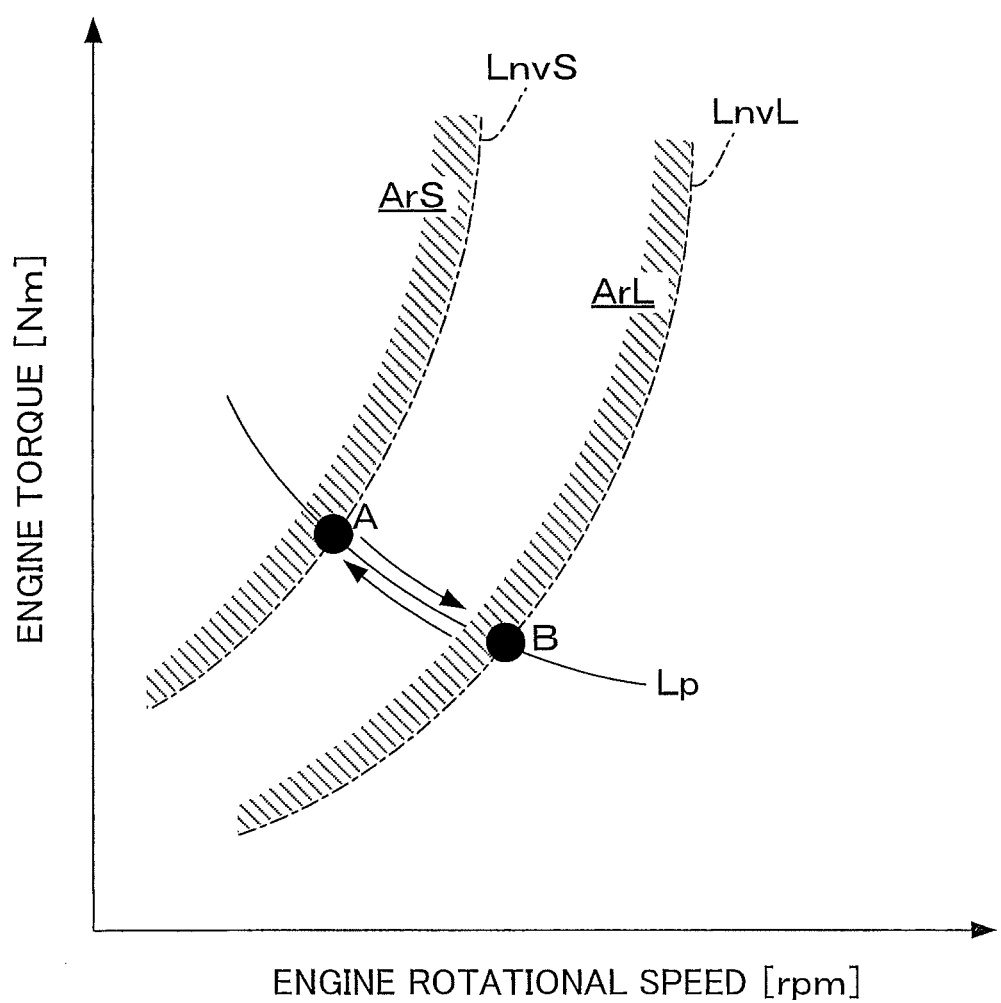
FIG. 3 is a figure for explanation of the relationship between noise suppression lines used in noise suppression control and operating points of the internal combustion engine.

As shown in FIG. 3, a noise suppression line LnvL which corresponds to the lean combustion is set to be more toward the low torque high rotational speed side than a noise suppression line LnvS which corresponds to the stoichiometric combustion. It is more difficult for the state of combustion during the lean combustion to be stable as compared to the case during the stoichiometric combustion, and this is because fluctuations in the output of the engine rotational speed and/or the engine torque and so on of the internal combustion engine 3 are greater. The noise suppression line LnvS corresponding to the stoichiometric combustion corresponds to the "first noise suppression line" of the Claims, while the noise suppression line LnvL corresponding to the lean combustion corresponds to the "second noise suppression line" of the Claims.

Figure 4:
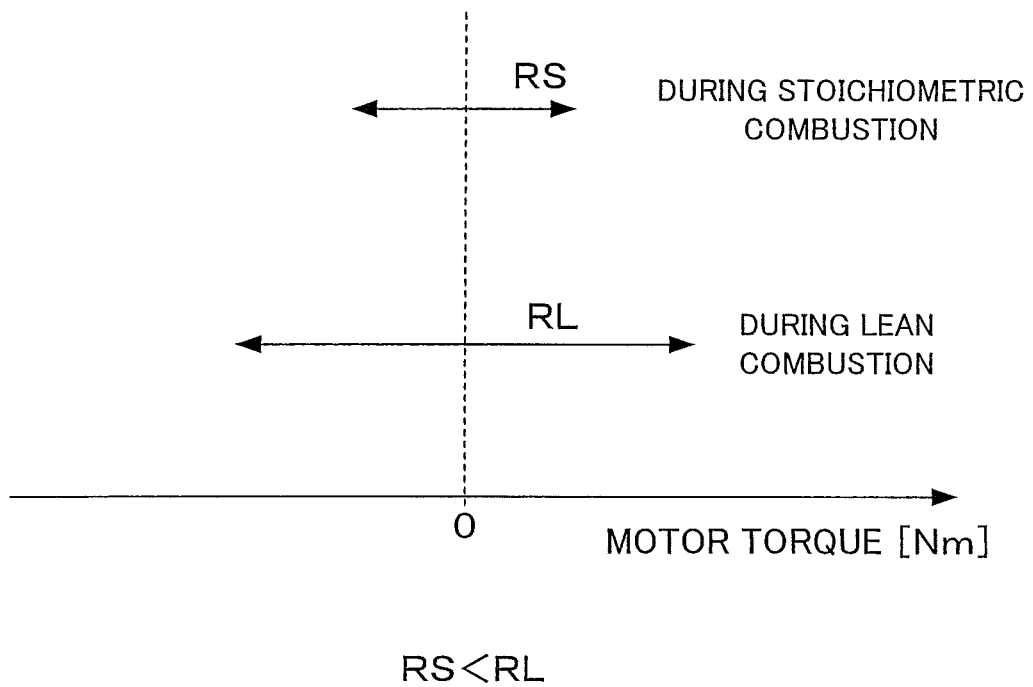
FIG. 4 is a figure showing an example of decision conditions that are set for each of lean combustion and stoichiometric combustion, when deciding whether or not to perform noise suppression control.

In the case of the lean combustion, a noise worsening region ArL shown by hatching is positioned more toward the high torque low rotational speed side than the noise suppression line LnvL. And, in the case of the stoichiometric combustion, a noise worsening region ArS shown by hatching is positioned more toward the high torque low rotational speed side than the noise suppression line LnvS. The noise worsening region ArL for the lean combustion is wider than the noise worsening region ArS for the stoichiometric combustion, and a part of the noise worsening region ArL overlaps the noise worsening region ArS. Accordingly, the decisions as to whether or not the noise suppression control should be performed in the case of the lean combustion and in the case of the stoichiometric combustion are implemented on the basis of decision conditions that are set for each of the operational modes of the internal combustion engine 3. In concrete terms, the presence of the motor torque within predetermined torque ranges RS and RL including 0 Nm is set for these decision conditions, as shown in FIG. 4. The torque range RL for the case of the lean combustion is wider than the torque range RS for the case of the stoichiometric combustion. As one example, the torque range RS may be set as being from −3 Nm to +3 Nm, while the torque range RL may be set as being from −5 Nm to +5 Nm.

Generally, it is considered that with the lean combustion, as compared with the case of the stoichiometric combustion, the fuel consumption amount is lower and the efficiency is higher, since the air/fuel ratio is higher. However, when the noise suppression control is performed with the lean combustion, the amount of variation of the operating point of the internal combustion engine from the fuel consumption line is greater, as compared with the case of the stoichiometric combustion. Accordingly, when the noise suppression control is performed with the lean combustion, it is considered that fuel consumption worsening tendency is higher than when the noise suppression control is performed with the stoichiometric combustion. Due to this, depending upon the driving conditions of the internal combustion engine 3, in some cases it is possible for the thermal efficiency when the noise suppression control is performed with the stoichiometric combustion to be better than when the noise suppression control is performed with the lean combustion. Of course, depending upon the driving conditions of the internal combustion engine 3, there are also some cases in which the thermal efficiency when the noise suppression control is performed with the lean combustion is better than when the noise suppression control is performed with the stoichiometric combustion. Accordingly, while performing the noise suppression control, the ECU 30 compares together the thermal efficiencies for each of the lean combustion and the stoichiometric combustion, and changes over the operational mode of the internal combustion engine 3 if it is determined that the thermal efficiency obtained by changing over the operational mode will be higher than in the case of staying in the current operational mode. To put this in another manner, among the lean combustion and the stoichiometric combustion, the ECU 30 selects that operational mode for which the thermal efficiency will be the higher when performing the noise suppression control.

It should be understood that control to change the air/fuel ratio that is to be implemented in order to change over the operational mode of the internal combustion engine 3 is implemented according to the requested drive torque by the ECU 30, or according to some other demand. In view of the air amount response delay, the changeover from the lean combustion to the stoichiometric combustion can be implemented over a short time interval with a temporary increase of the amount of fuel that is supplied to the internal combustion engine 3. Due to this, the engine torque also temporarily increases along with this increase of the fuel amount. On the other hand, also in view of the air amount response delay, the changeover from the stoichiometric combustion to the lean combustion can be implemented over a short time interval with a temporary decrease of the amount of fuel that is supplied to the internal combustion engine 3. Due to this, the engine torque also temporarily decreases along with this increase of the fuel amount. It should be understood that the ECU 30 increases and decreases the motor torque of the second motor-generator 5 in synchrony with the changing of the air/fuel ratio, in order to cancel out such increase and decrease of the engine torque accompanying changing over of the operational mode.

Figure 5:
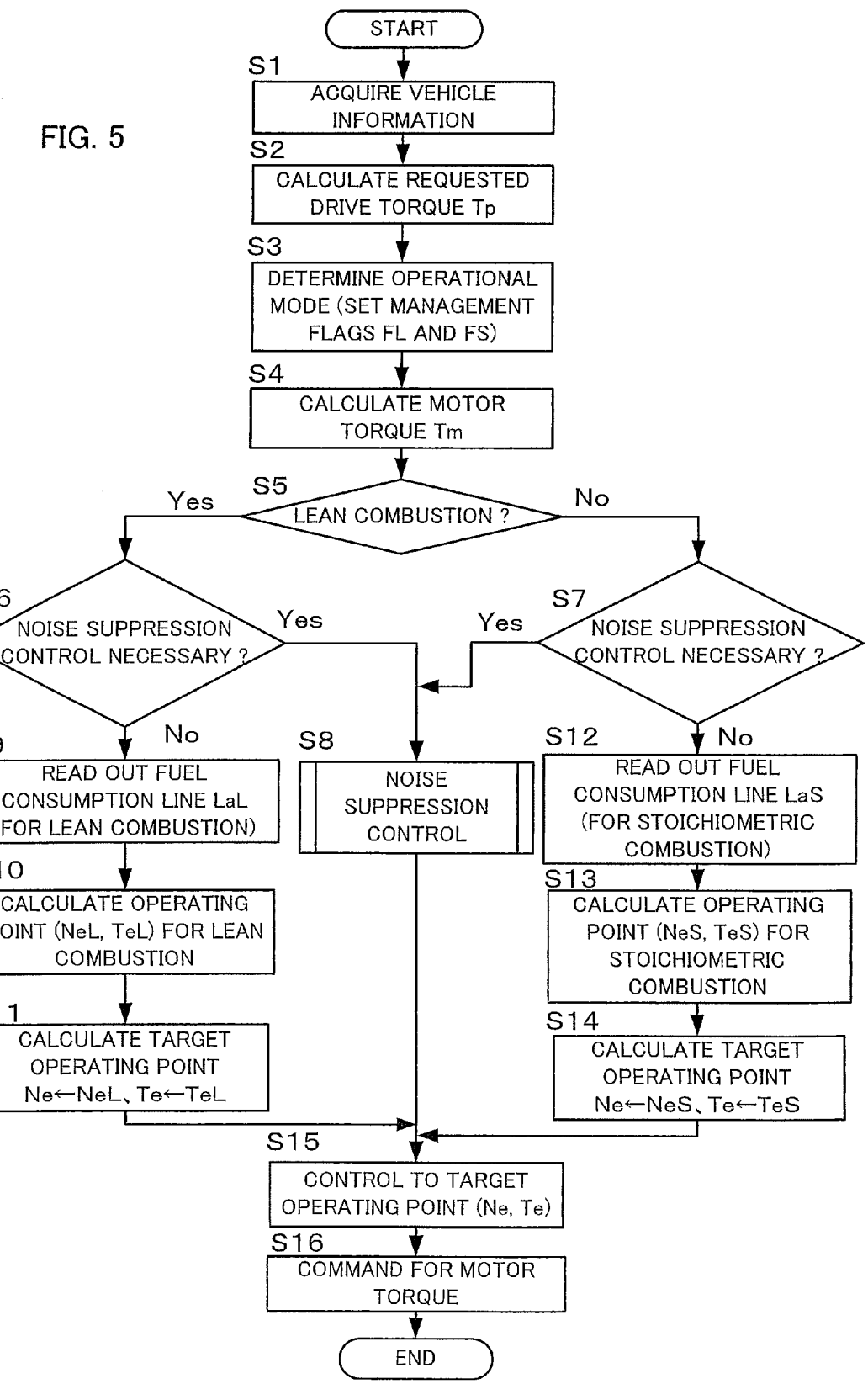
FIG. 5 is a flow chart showing an example of a control routine according to an embodiment of the present invention.
Figure 6:
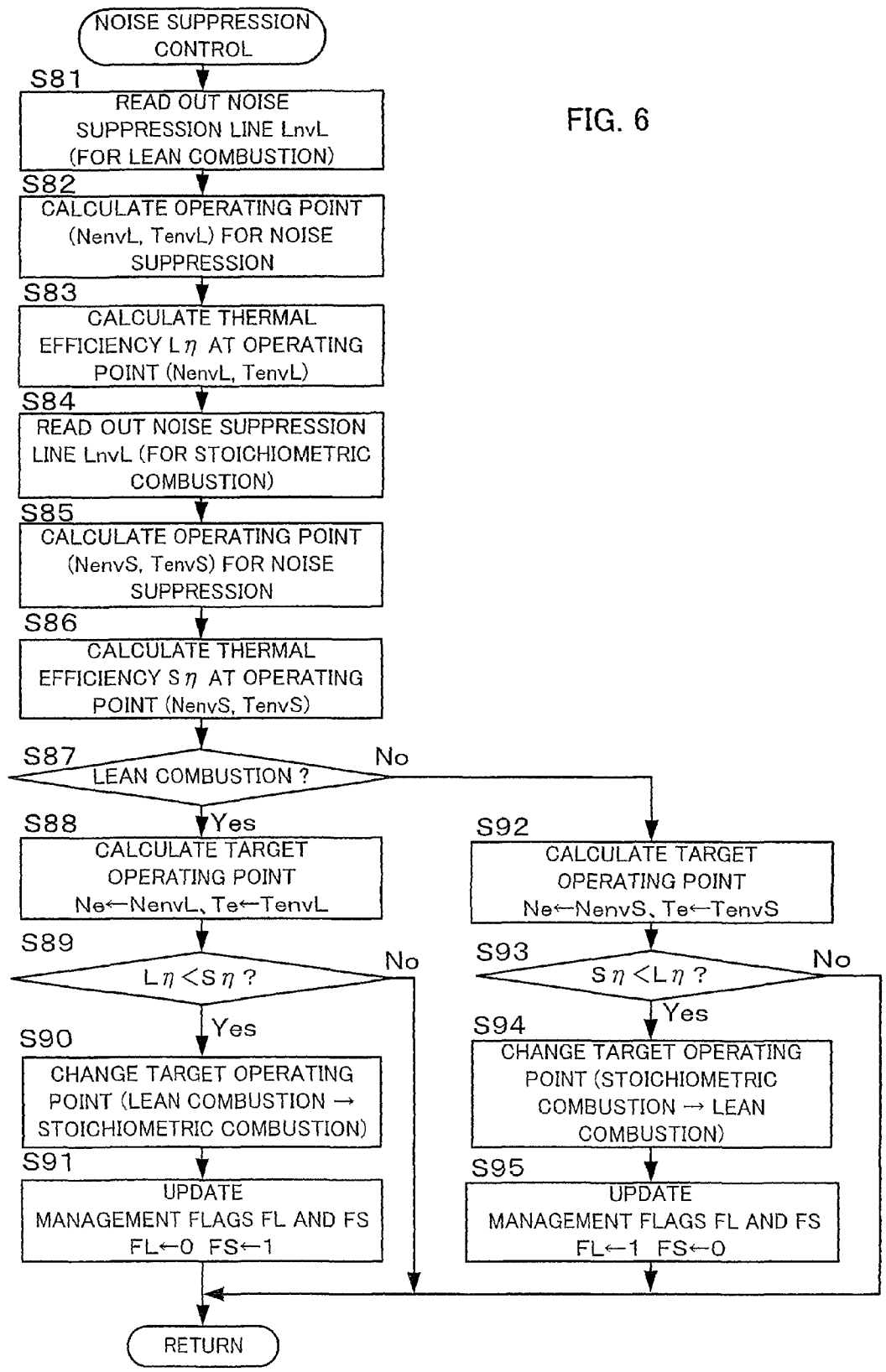
FIG. 6 is a flow chart showing an example of a subroutine of FIG. 5.

FIG. 5 and FIG. 6 show examples of control routines that are executed by the ECU 30. A program for the control routine of FIG. 6 is stored in the ECU 30, and is read out in a timely manner and is repeatedly executed on a predetermined cycle.

In a step S1, the ECU 30 acquires vehicle information about the vehicle 1 by referring to the sensors of various types described above and so on. Examples of the vehicle information acquired by the ECU 30 are the accelerator opening amount of the vehicle 1, its speed, the rotational speed of the internal combustion engine 3, and the rotational speeds and the torques of the motor-generators 4 and 5. In a step S2, the ECU 30 calculates the requested drive torque Tp on the basis of the accelerator opening amount and the vehicle speed. The requested drive torque Tp is calculated on the basis of a map that is set in advance. In a step S3, the ECU 30 determines, on the basis of the requested drive torque Tp that has thus been calculated and other vehicle information, whether the operational mode of the internal combustion engine 3 is the lean combustion or the stoichiometric combustion. Management flags FL and FS are allocated in a predetermined storage region of the ECU 30 for managing the operational mode of the internal combustion engine 3. The value of the management flag FL changes between the values 1 and 0. When this management flag FL is 1, it means that the lean combustion has been selected, whereas when the management flag FL is 0, it means that the stoichiometric combustion has been selected. In a similar manner, the value of the management flag FS changes between the values 1 and 0. When this management flag FS is 1, it means that the stoichiometric combustion has been selected, whereas when the management flag FS is 0, it means that the lean combustion has been selected. Accordingly, when the ECU 30 has determined that the operational mode is the lean combustion, it sets the management flag FL to 1 and sets the management flag FS to 0. On the other hand, when the ECU 30 has determined that the operational mode is the stoichiometric combustion, it sets the management flag FS to 1 and sets the management flag FL to 0.

In a step S4, the ECU 30 calculates the motor torque Tm on the basis of the requested drive torque Tp. This calculation of the motor torque Tm is implemented by calculating a base value that corresponds to the requested drive torque Tp, and then performing guard processing to limit this base value with an upper limit value and a lower limit value of motor torque. This upper limit value and lower limit value of motor torque respectively correspond to the input limit and the output limit of the battery 16. The input and output limits of the battery 16 are set on the basis of its rating or the like. It should be understood that, if the motor torque Tm experiences limitation due to this guard processing, then the requested drive torque Tp is corrected according to this limitation. Due to this correction, fluctuations of the torque outputted from the drive wheels 18 are suppressed.

In a step S5, the ECU 30 refers to the management flags FL and FS, and makes a decision as to whether or not the operational mode that was determined in the step S3 is the lean combustion. If the operational mode is the lean combustion, then the flow of control proceeds to a step S6. But if the operational mode is not the lean combustion, in other words if the operational mode is the stoichiometric combustion, then the flow of control is transferred to a step S7. In the step S6, the ECU 30 makes a decision as to whether or not it is necessary to implement the noise suppression control. This decision is implemented by taking, as a reference, whether or not the motor torque Tm that was calculated in the step S4 is within the torque range RL of FIG. 3 that has been set to correspond to the lean combustion. In a similar manner, in the step S7, the ECU makes a decision as to whether or not it is necessary to implement the noise suppression control by taking, as a reference, whether or not the motor torque Tm is within the torque range RS. If as the result of the step S6 or the step S7 it is decided that it is necessary to perform the noise suppression control, then the ECU 30 implements the noise suppression control in a step S8. It should be understood that the details of this noise suppression control will be explained hereinafter.

In a step S9, the ECU 30 reads out a fuel consumption line LaL for lean consumption from a predetermined storage device. And then in a step S10, by obtaining the point of intersection of the line of equal power corresponding to the requested drive torque Tp that was calculated in the step S2 and the fuel consumption line LaL that was read out in the step S9, the ECU 30 calculates an operating point of the internal combustion engine 3 to be the control target during the lean combustion, in other words calculates an engine rotational speed NeL and an engine torque TeL. In a step S11, the ECU 30 calculates an operating point (Ne, Te) of the internal combustion engine 3 that is to become the target. In other words, NeL is substituted into Ne and TeL is substituted into Te. Then the flow of control is transferred to a step S15.

On the other hand, in the case of the stoichiometric combustion, in a similar manner to the case described above, an operating point of the internal combustion engine 3 that is to become a target is calculated by executing steps S12 through S14. That is to say, in the step S12, the ECU 30 reads out a fuel consumption line LaS for stoichiometric consumption from a predetermined storage device. In a step S13, by obtaining the point of intersection of the line of equal power corresponding to the requested drive torque Tp and the fuel consumption line LaS that was read out in the step S12, the ECU 30 calculates an operating point of the internal combustion engine 3 that is to be the control target during the stoichiometric combustion, in other words calculates an engine rotational speed NeS and an engine torque TeS. In a step S14, the ECU 30 calculates an operating point (Ne, Te) of the internal combustion engine 3 that is to become a target by substituting NeS into Ne and TeS into Te, and then the flow of control is transferred to the step S15.

In the step S15, the ECU 30 controls the internal combustion engine 3 and the first motor-generator 4 so as to perform operation at the operating point (Ne, Te) that was obtained by the processing of the step S11, the step S8, or the step S14. In a step S16, the ECU 30 controls the second motor-generator 5 so as to perform operation at the motor torque Tm that was calculated in the step S4. And then this cycle of the routine terminates.

Next, an example of the noise suppression control will be explained with reference to FIG. 6. In a step S81, the ECU 30 reads out the noise suppression line LnvL for the lean combustion. In a step S82, the ECU 30 calculates an operating point (NenvL, TenvL) of the internal combustion engine 3 for use during the noise suppression control. This operating point is calculated by obtaining the point of intersection between the line of equal power corresponding to the requested drive torque Tp that was calculated in the step S2 of FIG. 5 and the noise suppression line LnvL that was read out in the step S81. In a step S83, the ECU 30 calculates the thermal efficiency $L\eta$ of the internal combustion engine 3 at this operating point (NenvL, TenvL). For example, the thermal efficiency $L\eta$ may be calculated by searching a map in which a correspondence relationship between the thermal efficiency during the lean combustion and the operating point is prescribed, this map being constructed in advance by testing with actual equipment or the like. It would also be possible to calculate the thermal efficiency $L\eta$ by using a predetermined calculation equation, rather than by using a map.

In a similar manner to that described above, in a step S84, the ECU 30 reads out the noise suppression line LnvS for the lean combustion. In a step S85, the ECU 30 calculates an operating point (NenvS, TenvS) of the internal combustion engine 3 for use during the noise suppression control by obtaining the point of intersection between the line of equal power corresponding to the requested drive torque Tp that was calculated in the step S2 of FIG. 5 and the noise suppression line LnvS that was read out in the step S84. In a step S86, the ECU 30 calculates the thermal efficiency $S\eta$ of the internal combustion engine 3 at this operating point (NenvS, TenvS). For example, in a similar manner to the case for the thermal efficiency $L\eta$ described above, the thermal efficiency $S\eta$ may also be calculated by searching a map in which a correspondence relationship between the thermal efficiency during the stoichiometric combustion and the operating point is prescribed, this map being constructed in advance by testing with actual equipment or the like. It would also be possible to calculate the thermal efficiency $S\eta$ by using a predetermined calculation equation, rather than by using a map.

In a step S87, by referring to the management flags FL and FS, the ECU 30 makes a decision as to whether or not the operational mode that was determined in the step S3 of FIG. 5 is the lean combustion. If the operational mode is the lean combustion then the flow of control proceeds to a step S88, whereas if it is the stoichiometric combustion then the flow of control is transferred to a step S92.

In the step S88, the ECU 30 calculates an operating point (Ne, Te) to be the target for the internal combustion engine 3 by substituting NenvL for Ne and TenvL for Te, and then the flow of control proceeds to a step S89. In this step S89, the ECU 30 makes a decision as to whether or not the thermal efficiency $S\eta$ during the stoichiometric combustion is higher than the thermal efficiency $L\eta$ during the lean combustion. In other words, the ECU 30 makes a decision as to whether or not the thermal efficiency if the noise suppression control is performed by changing over the operational mode from the lean combustion to the stoichiometric combustion will be higher than the thermal efficiency if the noise suppression control is performed while continuing the lean combustion, which is the current operational mode. If the thermal efficiency $S\eta$ is higher than the thermal efficiency $L\eta$, then the thermal efficiency will become higher if the operational mode is changed over from the lean combustion to the stoichiometric combustion. Accordingly, in a step S90, the ECU 30 changes the target operating point that was calculated in the step S88 to the one for the stoichiometric combustion. In other words, the ECU 30 calculates an operating point (Ne, Te) to be the target by substituting NenvS for Ne and TenvS for Te. In a step S91, the ECU 30 updates the values of the management flags FL and FS. In other words, the ECU 30 substitutes 0 for FL and 1 for FS, and then the flow of control is transferred to the step S15 of FIG. 5. And the internal combustion engine 3 is controlled to the operating point that has been calculated in the step S90. On the other hand, if the thermal efficiency $S\eta$ is not higher than the thermal efficiency $L\eta$, then, in order to maintain the operational mode at the lean combustion, the steps S90 and S91 are skipped, and the flow of control is transferred to the step S15 of FIG. 5, so that the internal combustion engine 3 is controlled to the operating point that was calculated in the step S88.

On the other hand, if the current operational mode is the stoichiometric combustion, then in the step S92 the ECU 30 calculates an operating point (Ne, Te) to be the target for the internal combustion engine 3 by substituting NenvS for Ne and TenvS for Te, and then the flow of control proceeds to a step S93. In this step S93, the ECU 30 makes a decision as to whether or not the thermal efficiency $L\eta$ during the lean combustion is higher than the thermal efficiency $S\eta$ during the stoichiometric combustion. In other words, the ECU 30 makes a decision as to whether or not the thermal efficiency if the noise suppression control is performed by changing over the operational mode from the stoichiometric combustion to the lean combustion will be higher than the thermal efficiency if the noise suppression control is performed while continuing the stoichiometric combustion, which is the current operational mode. If the thermal efficiency $L\eta$ is higher than the thermal efficiency $S\eta$, then the thermal efficiency will become higher if the operational mode is changed over from the stoichiometric combustion to the lean combustion. Accordingly, in a step S94, the ECU 30 changes the target operating point that was calculated in the step S92 to one for the lean combustion. In other words, the ECU 30 calculates an operating point (Ne, Te) to be the target by substituting NenvL for Ne and TenvL for Te. In a step S95, the ECU 30 updates the values of the management flags FL and FS. In other words, the ECU 30 substitutes 1 for FL and 0 for FS, and then the flow of control is transferred to the step S15 of FIG. 5. And the internal combustion engine 3 is controlled to the operating point that has been calculated in the step S94. On the other hand, if the thermal efficiency $L\eta$ is not higher than the thermal efficiency $S\eta$, then, in order to maintain the operational mode at the stoichiometric combustion, the steps S94 and S95 are skipped, and the flow of control is transferred to the step S15 of FIG. 5, so that the internal combustion engine 3 is controlled to the operating point that was calculated in the step S92.

It should be understood that, in some cases, the operating point of the internal combustion engine 3 changes abruptly due to the process of changing the operating point of the internal combustion engine 3 from the fuel consumption line LaL for the lean combustion onto the noise suppression line LnvL for the lean combustion, or from the fuel consumption line LaS for the stoichiometric combustion onto the noise suppression line LnvS for the stoichiometric combustion. Due to this, in this type of processing, it is also possible to change the engine rotational speed gradually according to a predetermined time rate of change. Furthermore, it is also possible to set this time range of change for each of the operational modes, so that the engine rotational speed is changed according to time rates of change which are different in the case of the above described processing for the lean combustion and in the case of the above described processing for the stoichiometric combustion.

Figure 7:
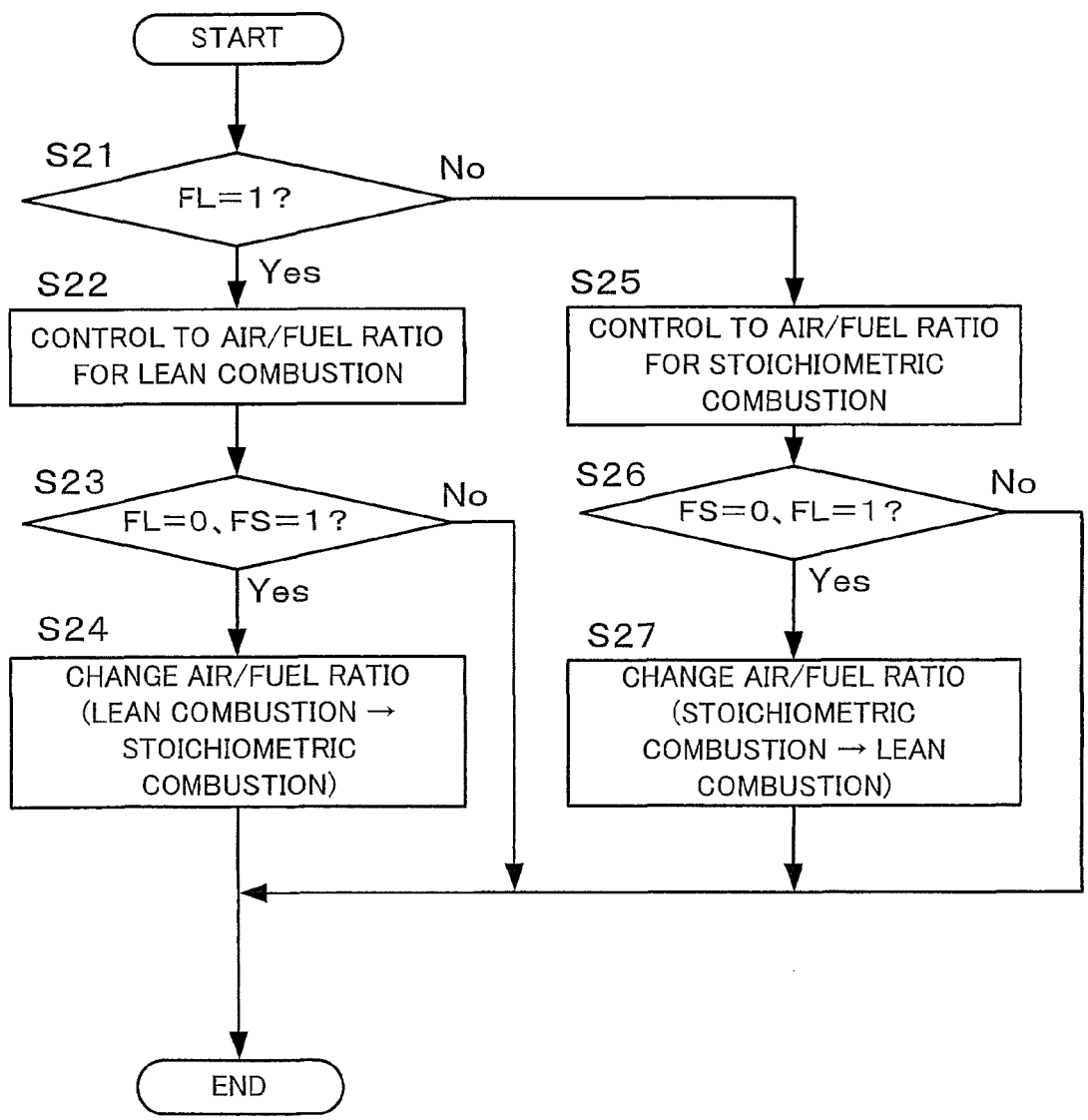
FIG. 7 is a flow chart showing an example of a control routine for air/fuel ratio control.

FIG. 7 shows an example of a control routine for air/fuel ratio control that is executed by the ECU 30 in parallel with the control routines of FIG. 5 and FIG. 6. In this air/fuel ratio control, the ECU 30 controls the air/fuel ratio of the internal combustion engine 3 to the air/fuel ratio which is the target for the case of the lean combustion, or to the air/fuel ratio which is the target for the case of the stoichiometric combustion, while referring to the management flags FL and FS described above for managing the operational mode. In a step S21, the ECU 30 determines whether or not the management flag FL is 1, and if the management flag FL is 1 then the flow of control proceeds to a step S22. But if the management flag FL is not 1, then the flow of control is transferred to a step S25.

In the step S22, in order to maintain the lean combustion, the ECU 30 controls the operational mode of the internal combustion engine 3 to the air/fuel ratio that has been targeted for the lean combustion. It should be understood that the air/fuel ratio control that is implemented by this control routine is the same as a per se known type. In this control, the current air/fuel ratio is acquired by referring to the signal from an oxygen density sensor not shown in the figures, and feedback control is performed so as to reduce the difference between this air/fuel ratio and the target air/fuel ratio. In a step S23, the ECU 30 makes a decision as to whether or not the values of the management flags FL and FS have changed. In other words, the ECU 30 makes a decision as to whether or not these values have changed to values (FL=0 and FS=1) that mean a changeover from the lean combustion to the stoichiometric combustion. If a change of this kind has taken place, then it is determined that a request for changeover of operational mode has been issued, and in a step S24 the ECU 30 changes the air/fuel ratio of the internal combustion engine 3 from the air/fuel ratio for the lean combustion to the air/fuel ratio for the stoichiometric combustion. In consideration of the response delay in the air amount described above, this change of air/fuel ratio when changing from the lean combustion to the stoichiometric combustion is implemented by providing a temporary increase over a short time interval of the amount of fuel that is supplied to the internal combustion engine 3. On the other hand, if the management flags FL and FS have not changed, then the step S24 is skipped and this cycle of the routine terminates.

If a negative decision is reached in the step S21, then this is a situation in which the stoichiometric combustion is selected. Accordingly in the step S25, in order to maintain the stoichiometric combustion, the ECU 30 controls the operational mode of the internal combustion engine 3 to the air/fuel ratio that has been targeted for the stoichiometric combustion. In a step S26, the ECU 30 makes a decision as to whether or not the values of the management flags FL and FS have changed to values (FL=1 and FS=0) that mean a changeover from the stoichiometric combustion to the lean combustion. If a change of this kind has taken place, then it is determined that a request for changeover of operational mode has been issued, and in a step S27 the ECU 30 changes the air/fuel ratio of the internal combustion engine 3 from the air/fuel ratio for the stoichiometric combustion to the air/fuel ratio for the lean combustion. In consideration of the response delay in the air amount described above, this change of air/fuel ratio when changing from the stoichiometric combustion to the lean combustion is implemented by providing a temporary decrease over a short time interval of the amount of fuel that is supplied to the internal combustion engine 3. On the other hand, if the management flags FL and FS have not changed, then the step S27 is skipped and this cycle of the routine terminates.

According to the control routine of FIG. 7, it is possible to change over to an appropriate air/fuel ratio in response to a change of the values of the management flags FL and FS by the control routines of FIG. 5 and FIG. 6 that is implemented in parallel with this control routine, in other words in response to a request for changeover of the operational mode of the internal combustion engine 3. To put it in another manner, both in the case of performing the noise suppression control and in the case of normal operation in which that control is not being performed, control of the operating point of the internal combustion engine 3 and change of the air/fuel ratio are implemented so as to be mutually synchronized.

By the control routines of FIG. 5 through FIG. 7 being executed by the ECU 30, while the noise suppression control is being executed, the operational mode of the internal combustion engine 3 is changed over if the thermal efficiency if the operational mode is changed over will be higher, as compared to the thermal efficiency if the operational mode of the internal combustion engine 3 is kept as it is. Accordingly, while the noise suppression control is being executed, it is possible to avoid the operational mode of the engine being kept just as it is even though the thermal efficiency of the internal combustion engine 3 in this mode is poor. Due to this, it is possible to suppress noise while still preventing deterioration of the thermal efficiency of the internal combustion engine 3.

By executing the control routine for noise suppression of FIG. 6 that was defined in the step S8 of FIG. 5, the ECU 30 functions as the "noise suppression control device" of the Claims; by executing the steps from S89 to S95 of FIG. 6 along with executing the control routine of FIG. 7, the ECU 30 functions as the "combustion changeover device" of the Claims; and, by executing the steps S83 and S36 of FIG. 6, the ECU 30 functions as the "thermal efficiency calculation device" of the Claims.

Embodiment #2

Next, a second embodiment of the present invention will be explained with reference to FIG. 3 and FIG. 8. This second embodiment has the distinguishing feature that the order in which change of the air/fuel ratio during execution of the noise suppression control described above and control of the operating point of the internal combustion engine 3 are implemented is changed according to the operational mode changeover pattern. The other features are the same as in the case of the first embodiment, and accordingly explanation thereof will be omitted.

As shown in FIG. 3, the case will be considered when the operating point of the internal combustion engine 3 transitions from the point A at which the noise suppression control is being performed with the stoichiometric combustion to the point B at which the noise suppression control is being performed with the lean combustion. When, after the air/fuel ratio is changed in the state in which the operating point of the internal combustion engine 3 is at the point A so that the operational mode changes from the stoichiometric combustion to the lean combustion, the operating point of the internal combustion engine 3 is shifted to the point B, then the noise becomes worse at the time point that the air/fuel ratio is changed, because the point A is positioned within the noise worsening region ArL which is more toward the low rotational speed high torque side than the noise suppression line LnvL for the lean combustion. Thus, in this second embodiment, in the case of the pattern for changing over from the stoichiometric combustion to the lean combustion, first the operating point of the internal combustion engine 3 is shifted from the point A to the point B which is toward the high rotational speed side, and subsequently the air/fuel ratio is changed so that the operational mode changes over from the stoichiometric combustion to the lean combustion. Since the shift from the point A to the point B is a shift toward the high rotational speed low torque side from the noise suppression line LnvS for the stoichiometric combustion, accordingly this is equivalent to a shift in the direction to reduce the noise. Accordingly, the noise does not get worse due to this shifting of the operating point. It should be understood that, if a predetermined buffer is present between the noise suppression line LnvL for the lean combustion and the noise worsening region ArL, and there is a certain space available for changing the air/fuel ratio, then it is also possible to change the air/fuel ratio during the shifting from the point A to the point B, in other words before the system arrives at the point B after having started to shift from the point A toward the point B. Accordingly, with the control according to this second embodiment, when the operating point of the internal combustion engine 3 transitions from the point A at which the noise suppression control is being performed with the stoichiometric combustion to the point B at which the noise suppression control is to be performed with the lean combustion, the air/fuel ratio is changed after the shifting of the operating point of the internal combustion engine 3 toward the high rotational speed side is started.

On the other hand, in the opposite manner to that described above, the case will be considered when the operating point of the internal combustion engine 3 transitions from the point B at which the noise suppression control is being performed with the lean combustion to the point A at which the noise suppression control is being performed with the stoichiometric combustion. In this case when, after the operating point of the internal combustion engine 3 is shifted from the point B to the point A, the air/fuel ratio is changed so that the operational mode changes from the lean combustion to the stoichiometric combustion, then in the lean combustion state the operating point enters into the noise worsening region ArL and the noise gets worse, due to the operating point of the internal combustion engine 3 being shifted from the point B to the point A which is toward the low rotational speed side. Thus, in this second embodiment, in the case of the pattern for changing over from the lean combustion to the stoichiometric combustion while performing the noise suppression control, first the air/fuel ratio is changed so that the system changes over from the lean combustion to the stoichiometric combustion, and subsequently the operating point of the internal combustion engine 3 is shifted from the point B to the point A which is toward the low rotational speed high torque side. Thus, since it is possible to avoid the operating point of the internal combustion engine 3 shifting toward the low rotational speed side in the state in which the operational mode is the lean combustion, accordingly it is possible to prevent the noise getting worse as the operational mode is changed over. In this case, after change of the air/fuel ratio has been started, it is also possible to shift the operating point of the internal combustion engine 3 from the point B to the point A before the changeover from the lean combustion to the stoichiometric combustion has been perfectly completed. In this case as well, it is possible to avoid the operating point changing toward the low rotational speed side in the state of the lean combustion. It should be understood that, in either of these changeover patterns, it is desirable to perform the shifting between the point A and the point B and so on along the line of equal power Lp. Since, in this case, it is possible to shift the operating point while maintaining the power of the internal combustion engine 3, accordingly the efficiency is higher, as compared with the case in which the power of the internal combustion engine 3 increases and/or decreases during the process of shifting of the operating point, and this increase and/or decrease is cancelled out by the motor torque of the second motor-generator 5.

Figure 8:
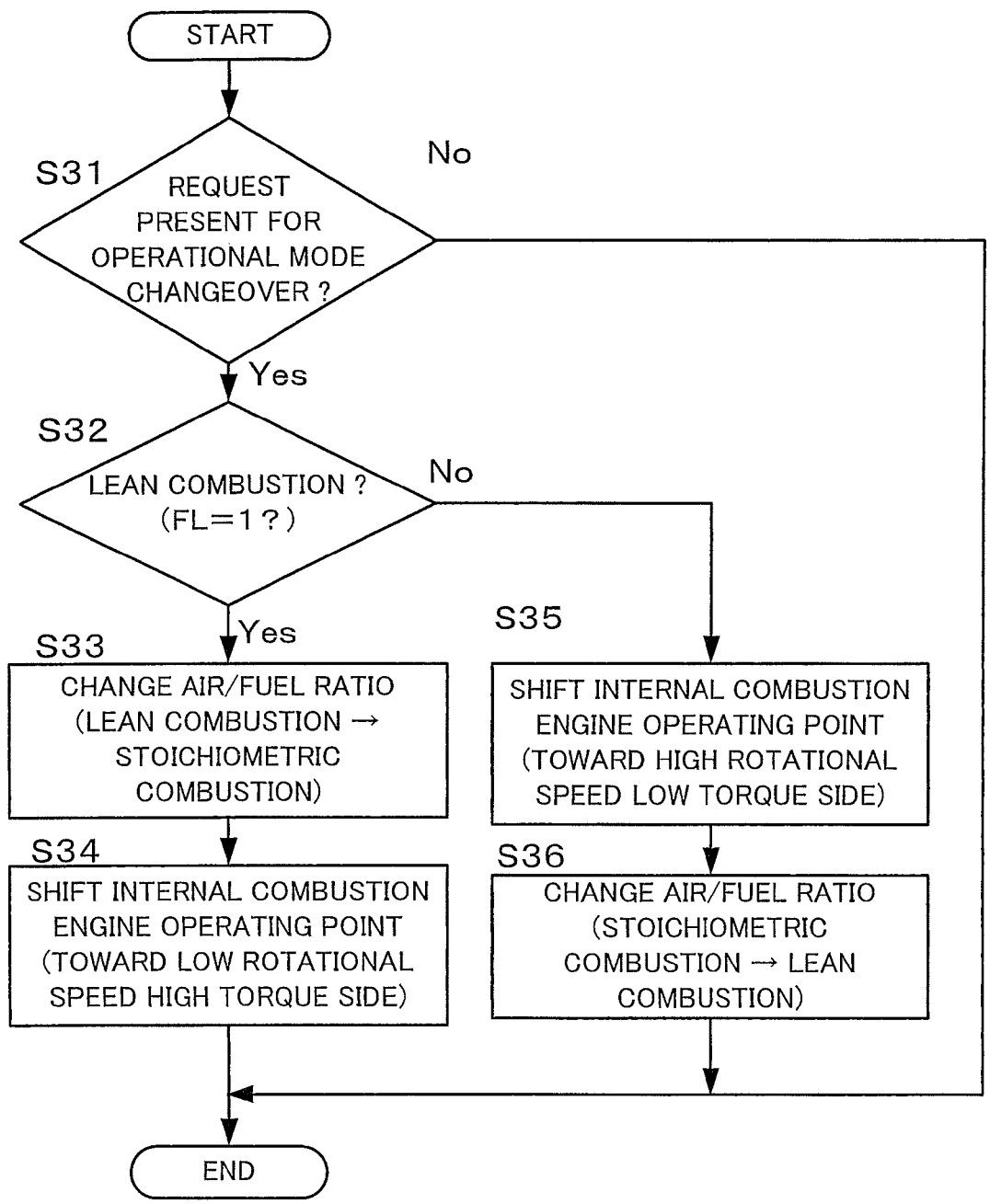
FIG. 8 is a flow chart showing an example of a control routine according to a second embodiment of the present invention.

The control described above may be implemented by the ECU 30 executing the control routine of FIG. 8. This control routine of FIG. 8 is repeatedly executed on a predetermined cycle in parallel with the control routines of FIG. 5 through FIG. 7 explained above in connection with the first embodiment. In a step S31, the ECU 30 determines whether or not a request to change over the operational mode is present. This presence or absence of the request to change over the operational mode is determined by detecting change of the values of the management flags FL and FS. If the request for changeover is present, then the flow of control proceeds to a step S32. But if no request for changeover is present, then the subsequent processing is skipped and this cycle of the routine terminates.

In the step S32, the ECU 30 refers to the management flag FL, and makes a decision as to whether or not the current operational mode of the internal combustion engine 3 is the lean combustion. If the current operational mode is the lean combustion, then the flow of control proceeds to a step S33. In this step S33, the ECU 30 changes the air/fuel ratio from the air/fuel ratio for the lean combustion to the air/fuel ratio for the stoichiometric combustion, thus changing over from the lean combustion to the stoichiometric combustion. And next, in a step S34, the ECU 30 shifts the operating point of the internal combustion engine 3 toward the low rotational speed high torque side upon the noise suppression line LnvS for the stoichiometric combustion. The sequence of the step S33 and the step S34 is implemented by the ECU 30 controlling the timing of execution of the step S15 of FIG. 5 and the timing of execution of the step S24 of FIG. 7. It should be understood that it would also be acceptable for these execution timings to be controlled so that the shifting of the operating point of the internal combustion engine 3 is started before the changing of the air/fuel ratio is completed.

On the other hand, if the operational mode is not the lean combustion, in other words if the current mode is the stoichiometric combustion, then the flow of control proceeds to a step S35. In this step S35, the ECU 30 shifts the operating point of the internal combustion engine 3 toward the low rotational speed high torque side upon the noise suppression line LnvL for the lean combustion. And next, in a step S36, the ECU 30 changes the air/fuel ratio from the air/fuel ratio for the stoichiometric combustion to the air/fuel ratio for the lean combustion, thus changing over from the stoichiometric combustion to the lean combustion. The sequence of the step S35 and the step S36 is implemented by the ECU 30 controlling the timing of execution of the step S15 of FIG. 5 and the timing of execution of the step S27 of FIG. 7. It should be understood that it would also be acceptable for these execution timings to be controlled so that the changing of the air/fuel ratio is started before the shifting of the operating point of the internal combustion engine 3 is completed.

Since, with this second embodiment, control of the operating point of the internal combustion engine 3 and change of the air/fuel ratio are implemented in an order that is adapted to the operational mode changeover pattern, accordingly, whatever the changeover pattern may be, it is still possible to prevent the noise getting worse along with changeover of the operational mode. By executing the control routine of FIG. 8 along with the control routines of FIGS. 5 through 7, the ECU 30 functions as the "combustion changeover device" of the Claims.

The present invention is not to be considered as being limited to the embodiments described above; the present invention could be implemented in various different ways within the scope of its gist. And while, in the embodiments described above, the present invention was applied to a hybrid vehicle of a type in which two motor-generators were provided, and one of these motor-generators and an internal combustion engine were connected by a power split mechanism, the subject of application of the present invention is not limited to being a hybrid vehicle of this type. For example, the present invention could also be applied to a hybrid vehicle of a type in which the motor torque of a single electric motor is transmitted to an output unit to which the engine torque of an internal combustion engine is also outputted.

While, in the embodiments described above, the noise suppression control was implemented by using noise suppression lines that were prepared for each operational mode of the internal combustion engine, the use of such noise suppression lines is only cited by way of example. For example, it would also be possible to implement the noise suppression control according to a method in which it is forecast that the operating point of the internal combustion engine will enter into a noise worsening region that is determined in advance, and, in order to avoid the operating point entering into this noise worsening region, the operating point of the internal combustion engine is limited by repeatedly correcting the operating point of the internal combustion engine that is to be the target.

The invention claimed is:

1. A control apparatus applied to a hybrid vehicle that comprises, as power sources for propulsion, an internal combustion engine that is capable of changing over to lean combustion and to stoichiometric combustion and an electric motor, and in which engine torque of the internal combustion engine and motor torque of the electric motor are outputted to a drive wheel via a power transmission mechanism that includes a gear group, comprising:
   a combustion changeover device configured to change over an operational mode of the internal combustion engine between the lean combustion and the stoichiometric combustion by changing the air/fuel ratio of the internal combustion engine;
   a noise suppression control device configured to, during each of the lean combustion and the stoichiometric combustion, execute noise suppression control in which an operating point of the internal combustion engine as defined by engine rotational speed and engine torque is limited so that noise generated by the power transmission mechanism is suppressed; and
   a thermal efficiency calculation device configured to calculate a thermal efficiency of the internal combustion engine, both when the noise suppression control is being executed with the lean combustion, and also when the noise suppression control is being executed with the stoichiometric combustion;
   wherein the combustion changeover device changes over the operational mode of the internal combustion engine if the thermal efficiency calculated by the thermal efficiency calculation device will be higher if the noise suppression control is executed with the operational mode of the internal combustion engine being changed over, than if the noise suppression control is executed with the operational mode of the internal combustion engine being kept the same.

2. The control apparatus according to claim 1, wherein:
   the noise suppression control device, when changing over from the stoichiometric combustion to the lean combustion during execution of the noise suppression control, shifts the operating point of the internal combustion engine toward a high rotational speed side from the stoichiometric combustion to the lean combustion is made; and
   the combustion changeover device, when changing over the operational mode of the internal combustion engine from the stoichiometric combustion to the lean combustion, changes the air/fuel ratio of the internal combustion engine after the noise suppression control device has started to shift the operating point of the internal combustion engine toward the high rotational speed side.

3. The control apparatus according to claim 1, wherein:
   the noise suppression control device, when changing over from the lean combustion to the stoichiometric combustion during execution of the noise suppression control, shifts the operating point of the internal combustion engine toward a low rotational speed side; and
   the combustion changeover device, when changing over the operational mode of the internal combustion engine from the lean combustion to the stoichiometric combustion, starts changing the air/fuel ratio of the internal combustion engine before the noise suppression control device shifts the operating point of the internal combustion engine toward the low rotational speed side.

4. The control apparatus according to claim 1, wherein:
   a first noise suppression line that corresponds to the stoichiometric combustion, and a second noise suppression line that corresponds to the lean combustion and that is positioned more toward a high rotational speed low torque side than the first noise suppression line are set in terms of engine rotational speed and engine torque; and
   the noise suppression control device performs the noise suppression control by limiting the operating point of the internal combustion engine to be upon either one of the first noise suppression line and the second noise suppression line, and moreover, according to changeover of the operating mode of the internal combustion engine, shifts the operating point of the internal combustion engine from being upon one of the first noise suppression line or the second noise suppression line, to being upon the other one of the first noise suppression line or the second noise suppression line.

5. The control apparatus according to claim 4, wherein the combustion changeover device, when changing over the operational mode of the internal combustion engine from the stoichiometric combustion to the lean combustion, changes the air/fuel ratio of the internal combustion engine after the noise suppression control device has started to shift the operating point of the internal combustion engine from being upon the first noise suppression line toward the second noise suppression line.

6. The control apparatus according to claim 4, wherein the combustion changeover device, when changing over the operational mode of the internal combustion engine from the lean combustion to the stoichiometric combustion, starts to change the air/fuel ratio of the internal combustion engine before the noise suppression control device shifts the operating point of the internal combustion engine from being upon the second noise suppression line toward the first noise suppression line.

7. The control apparatus according to claim 4, wherein the combustion changeover device shifts the operating point of the internal combustion engine along a line of equal power that connects the first noise suppression line and the second noise suppression line.

* * * * *